United States Patent
Park et al.

(10) Patent No.: US 8,470,495 B2
(45) Date of Patent: Jun. 25, 2013

(54) ELECTRODE CATALYST WITH IMPROVED LONGEVITY PROPERTIES AND FUEL CELL USING THE SAME

(75) Inventors: Byungwoo Park, Seoul (KR); Chunjoong Kim, Seoul (KR); Myunggoo Kang, Seoul (KR); Jin Nam Park, Seoul (KR); Hyuk Kim, Seoul (KR); Min Suk Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 771 days.

(21) Appl. No.: 11/488,175

(22) Filed: Jul. 18, 2006

(65) Prior Publication Data

US 2007/0248862 A1  Oct. 25, 2007

(30) Foreign Application Priority Data

Jul. 19, 2005 (KR) .................. 10-2005-0065206

(51) Int. Cl.
| | |
|---|---|
| H01M 4/38 | (2006.01) |
| H01M 8/10 | (2006.01) |
| H01M 8/06 | (2006.01) |
| H01M 8/14 | (2006.01) |
| B01J 27/00 | (2006.01) |
| B01J 23/40 | (2006.01) |
| B01J 23/42 | (2006.01) |
| B01J 23/44 | (2006.01) |

(52) U.S. Cl.
USPC ........... 429/485; 429/524; 429/525; 429/526; 429/483; 429/492; 502/208; 502/26; 502/339

(58) Field of Classification Search
USPC .. 429/524, 525, 526, 483, 485, 492; 502/208, 502/326, 339
See application file for complete search history.

(56) References Cited

U.S. PATENT DOCUMENTS

| | | | |
|---|---|---|---|
| 2003/0004054 A1 | 1/2003 | Ito et al. | |
| 2004/0038105 A1* | 2/2004 | Hennige et al. | 429/33 |
| 2004/0072061 A1* | 4/2004 | Nakano et al. | 429/44 |
| 2004/0259018 A1* | 12/2004 | Tsuji et al. | 430/137.15 |
| 2005/0089755 A1 | 4/2005 | Matsubara et al. | |
| 2005/0142428 A1* | 6/2005 | Daimon et al. | 429/40 |
| 2005/0287419 A1* | 12/2005 | Kim et al. | 429/40 |
| 2006/0019146 A1* | 1/2006 | Yoshitake et al. | 429/44 |

FOREIGN PATENT DOCUMENTS

| | | |
|---|---|---|
| JP | 59-075560 | 4/1984 |
| JP | 09-167620 | 6/1997 |
| JP | 2003-80077 | 3/2003 |
| JP | 2005-005257 | 1/2005 |
| KR | 1019990012201 A | 2/1999 |
| KR | 1020040023640 A | 3/2004 |
| KR | 1020050034530 A | 4/2005 |
| WO | WO03/100890 | * 12/2003 |

OTHER PUBLICATIONS

Kennedy et al., "Reactivity of $RuO_2$ as a promoter for methanol oxidation", Journal of Electroanalytical Chemistry and Interfacial Electrochemistry 293, p. 103-110, 1990.

* cited by examiner

*Primary Examiner* — Eugenia Wang
(74) *Attorney, Agent, or Firm* — McKenna Long & Aldridge, LLP

(57) ABSTRACT

Disclosed is an electrode catalyst comprising: (a) a support; (b) metal catalyst particles supported on the support and formed of a catalytically active metal or metal-containing alloy; and (c) an anti-coarsening compound, which is dispersed in at least one region selected from the group consisting of interstitial spaces among the catalyst particles and contact sites between the support and the catalyst particles, and has a coarsening temperature higher than that of the catalyst. A method for preparing the electrode catalyst is also disclosed.

13 Claims, 2 Drawing Sheets

US 8,470,495 B2

ELECTRODE CATALYST WITH IMPROVED LONGEVITY PROPERTIES AND FUEL CELL USING THE SAME

This application claims the benefit of the filing date of Korean Patent Application No. 10-2005-0065206, filed on Jul. 19, 2005 in the Korean Intellectual Property Office, the disclosure of which is incorporated herein in its entirely by reference.

TECHNICAL FIELD

The present invention relates to an electrode catalyst that provides a fuel cell with excellent lifespan characteristics by preventing metal catalyst components from coarsening due to variations in temperature while not adversely affecting the electrochemical quality. Also, the present invention relates to a method for preparing the same electrode catalyst and a fuel cell comprising the same electrode catalyst.

BACKGROUND ART

Recently, active and intensive studies of fuel cells as next-generation energy sources have been conducted since fuel cells are pollution-free clean energy sources so that they can substitute for other existing energy sources. The basic concept of a fuel cell is the use of electrons generated by the reaction of hydrogen with oxygen. A fuel cell is defined as a cell capable of producing direct current by converting chemical energy, derived from a chemical reaction of fuel gas including hydrogen with an oxidant including oxygen, directly into electric energy. Unlike other conventional batteries, fuel cells generate electricity by utilizing fuel and air supplied from the exterior. Fuel cells may be classified depending on drive conditions into phosphoric acid fuel cells, alkaline fuel cells, proton exchange membrane fuel cells, molten carbonate fuel cells, direct methanol fuel cells and solid electrolyte fuel cells. Particularly, proton exchange membrane fuel cells (PEMFC) have a high energy density and can be used at room temperature, and thus have been in the spotlight as portable electric power sources.

In a proton exchange membrane fuel cell (PEMFC), protons generated in the anode are transferred to the cathode through a polymer electrolyte membrane, thereby forming water via the bonding of oxygen and electrons. A PEMFC utilizes the electrochemical energy generated at this time. Because a PEMFC is driven at a low temperature, it shows a relatively low efficiency when compared to other fuel cells. Therefore, platinum-supported carbon is generally used as a catalyst in a PEMFC in order to increase the efficiency of the fuel cell. In fact, use of a platinum-supported carbon catalyst provides a fuel cell with a markedly improved quality when compared to fuel cells using other metal-supported catalysts.

However, because platinum supported on a support of the platinum-supported carbon used as a catalyst for a proton exchange membrane fuel cell merely has a size of several nanometers, the catalyst is unstabilized as electrochemical reactions proceed and coarsening of platinum nanoparticles occur. Such coarsening of platinum nanoparticles gradually causes a drop in surface area of platinum nanoparticles required for the reactions. This also adversely affects the quality of a fuel cell.

DISCLOSURE OF THE INVENTION

Therefore, the present invention has been made in view of the above-mentioned problems. The inventors of the present invention have found that when a compound capable of preventing metal or metal-containing alloy particles from coarsening is coated onto and/or dispersed into interstitial spaces among catalytically active components present on a support, such as platinum or platinum-containing particles, and/or contact sites between the support and the metal particles, it is possible to prevent the electrode catalyst components from coarsening while not adversely affecting the electrochemical quality of a fuel cell, and thus to improve the lifespan characteristics of the fuel cell.

Therefore, it is an object of the present invention to provide an electrode catalyst having excellent lifespan characteristics due to its structural stability, a method for preparing the same electrode catalyst, and a fuel cell comprising the same electrode catalyst.

It is another object of the present invention to provide a method for preventing a metal catalyst component supported on a support from coarsening by enhancing the structural stability of the metal catalyst component.

According to an aspect of the present invention, there is provided an electrode catalyst comprising: (a) a support; (b) metal catalyst particles supported on the support and formed of a catalytically active metal or metal-containing alloy; and (c) an anti-coarsening compound, which is dispersed in at least one region selected from the group consisting of interstitial spaces among the metal catalyst particles and contact sites between the support and the metal catalyst particles, and has a coarsening temperature higher than that of the metal catalyst. Also, the present invention provides a method for preparing the same electrode catalyst, a membrane electrode assembly (MEA) comprising the same electrode catalyst, and a fuel cell, preferably a proton exchange membrane fuel cell (PEMFC) comprising the same membrane electrode assembly.

According to another aspect of the present invention, there is provided a method for preventing metal catalyst particles supported on a support and formed of a catalytically active metal or metal-containing alloy from coarsening, the method comprising: dispersing an anti-coarsening compound having a coarsening temperature higher than that of the metal catalyst, in at least one region selected from the group consisting of interstitial spaces among the metal catalyst particles and contact sites between the support and the metal catalyst particles.

Hereinafter, the present invention will be explained in more detail.

According to the present invention, a compound (anti-coarsening compound) having a coarsening temperature higher than that of the catalytically active component is dispersed onto the electrode catalyst (e.g. platinum-supported carbon) used in a fuel cell, wherein the compound is dispersed in and coated onto specific sites capable of inhibiting the metal catalyst particles from coarsening, such specific sites including interstitial spaces among the metal catalyst particles and contact sites between the support and the metal catalyst particles (see FIG. 1). The term "coarsening temperature" refers to the temperature where crystal particles start to grow.

By virtue of the above characteristics of the present invention, it is possible to obtain the following effects.

A conventional catalytically active component, including a metal such as platinum, is generally provided in the form of particles having a small diameter of several nanometers so as to show excellent catalytic activity via an increased specific surface area. Such catalytically active component particles become unstable as electrochemical reactions proceed, thereby causing a so-called coarsening phenomenon including agglomeration of the particles. Such coarsening causes a drop in surface area of catalyst particles needed for the reactions, resulting in degradation of the quality of a fuel cell using the catalyst. To solve this problem, a certain compound (anti-coarsening compound) has been introduced onto the surface of the catalyst particles. However, presence of such anti-coarsening compounds on the surface of the metal catalyst particles causes an increase in electric resistance among the metal catalyst particles and a drop in proton conductivity to the surface of the metal catalyst particles. In addition to this, the surface of the metal catalyst particles to be used in catalytic reactions is poisoned by the anti-coarsening compounds and the catalyst shows a decreased reactive surface, resulting in degradation of the quality of a fuel cell.

On the contrary, according to the present invention, the anti-coarsening compound is not coated on the surface of the catalytically active particles but is coated onto and/or dispersed in specific sites capable of inhibiting the metal catalyst particles from coarsening to the highest degree, such specific sites including interstitial spaces among the metal catalyst particles and contact sites between the support and the metal catalyst particles. Therefore, even if the catalytically active particles become unstable during electrochemical reactions, it is possible to inhibit the metal catalyst particles from coarsening. Accordingly, it is possible to increase the thermal and structural stability of an electrode catalyst, to minimize degradation of the quality of a fuel cell, and to improve the lifespan characteristics of a fuel cell. In fact, it can be seen from the following experimental examples that coarsening of nanoparticles of a catalytically active metal or metal alloy is significantly reduced according to the present invention.

(1) According to the present invention, the anti-coarsening compound, which is dispersed uniformly in interstitial spaces among the electrode catalyst, for example catalyst particles formed of a catalytically active metal or metal-containing alloy supported on a support, and/or in contact sites between the support and the catalyst particles so as to improve the structural stability of the electrode catalyst, includes any compound having a coarsening temperature higher than that of the metal catalyst particles formed of the catalytically active metal or metal-containing alloy, with no particular limitation. For example, most noble metal elements initiate coarsening at a temperature of 300° C. or lower, thereby causing degradation of the quality and lifespan characteristics of a fuel cell. Thus, an anti-coarsening compound having a coarsening temperature of at least 300° C. is preferred.

(2) Additionally, it is preferable that the anti-coarsening compound causes no degradation in the catalytic activity, i.e. electrochemical quality, of the noble metal or metal-containing alloy particles. Particularly, it is preferable that the anti-coarsening compound has a higher affinity to the catalyst support as compared to its affinity to the metal catalyst component.

Herein, the term "affinity" refers to a degree of deposition (coating) of the anti-coarsening compound. In other words, because the surface of carbon and that of the metal (e.g. platinum) particles have different hydrophilicity and redox capability, an anti-coarsening compound having a different degree of affinity to those surfaces showing different electrochemical properties can be positioned selectively in specific sites instead of the metal surface, such sites including interstitial spaces among the metal catalyst particles and contact sites between the support and the metal catalyst particles.

Non-limiting examples of the compound having the above characteristics include metal phosphates, metal oxides, metal nitrides, metal fluorides, metal carbides, or the like, wherein the metal includes a conventional metal known to those skilled in the art, for example, an alkali metal, an alkaline earth metal, a Group 13 element in the Periodic Table, a Group 14 element in the Periodic Table, a transition metal, or the like.

Particular examples of such compounds include aluminum phosphate-based compounds, zirconium oxide, cerium oxide, silicon oxide, aluminum oxide or a mixture thereof. Among these compounds, metal phosphate-based compounds are insulators, while they have a loose structure and a small thickness, so that they do not interrupt diffusion of materials and they cause little drop in electrochemical quality of an electrode catalyst.

The anti-coarsening compound is dispersed on the surface of catalytically active metal or metal-containing alloy particles, interstitial spaces among the metal catalyst particles and/or contact sites between the support and the metal catalyst particles. In order to effectively prevent the metal catalyst particles from coarsening, the anti-coarsening compound is dispersed preferably in interstitial spaces among the metal catalyst particles and/or contact sites between the support and the metal catalyst particles. There are no particular limitations in the shape and thickness of the compound dispersed in the above sites, and the shape and thickness are controllable in such a range that the metal or metal-containing alloy particles can be prevented from coarsening. Preferably, the anti-coarsening compound is dispersed in a thickness of 1~5 nm.

There is no particular limitation in the main catalytically active component (b) forming the electrode catalyst according to the present invention, as long as it allows the oxidation of hydrogen or reduction of oxygen. The catalytically active component (b) includes any metal or metal-containing alloy generally known to those skilled in the art. Particularly, noble metals, for example platinum (Pt) or Pt-containing alloys are preferred. Herein, non-limiting examples of the metal that forms an alloy with platinum include ruthenium (Ru), rhodium (Rh), palladium (Pd), gold (Au), silver (Ag), iridium (Ir), osmium (Os) or a mixture thereof.

Although there is no particular limitation on the size (particle diameter) of the metal catalyst particles, the metal catalyst particles have a diameter preferably of 1~10 nm, more preferably of 1.5~5 nm. Additionally, the electrode catalyst comprising the catalytically active metal particles may be supported on a support known to those skilled in the art. The electrode catalyst comprising the metal component alone is also included in the scope of the present invention.

The support (a) forming the electrode catalyst according to the present invention is used to allow the noble metal catalyst to be dispersed widely in a broad surface area of the support and to improve physical properties including thermal and mechanical stability, which otherwise cannot be obtained by using the metal catalyst alone. For example, the metal catalyst may be coated on a support formed of microparticles currently used in the art. Any suitable methods other than the above coating method may also be used. Particular examples of the support that may be used in the present invention include porous carbon, conductive polymers or metal oxides.

Porous carbon that may be used as a support according to the present invention includes active carbon, carbon fiber, graphite fiber or carbon nanotubes, and conductive polymers that may be used in the present invention include polyvinyl carbazole, polyaniline, polypyrrole or a derivative thereof. Additionally, at least one metal oxide selected from the group consisting of oxides of tungsten, titanium, nickel, ruthenium, tantalum and cobalt may also be used as a support.

Although there is no particular limitation on the size of the support, the support has a size preferably of 0.01~10 μm, and more preferably of 0.05~0.5 μm.

The electrode catalyst can be obtained by using a conventional method, except that an anti-coarsening compound is dispersed uniformly in specific sites of the electrode catalyst. One embodiment of the method for preparing the electrode catalyst according to the present invention comprises the steps of: (a) dispersing or dissolving an anti-coarsening compound having a coarsening temperature higher than that of a catalytically active metal or metal-containing alloy into a solvent to provide a dispersion or solution; (b) adding a support, on which metal catalyst particles formed of the catalytically active metal or metal-containing alloy are supported, into the dispersion or solution obtained from step (a) so as to be coated with the dispersion or solution, followed by drying; and (c) heat treating the dried product obtained from step (b).

(1) First, a coating solution, in which a compound having a coarsening temperature higher than that of a catalytically active metal or metal-containing alloy is dispersed or dissolved, is prepared. Herein, the coating solution includes both a solution and a homogeneous suspension.

The anti-coarsening compound that may be used in the method is the same as defined hereinbefore. As the solvent, any solvent capable of dissolving or dispersing the above compound may be used, and distilled water is particularly preferred. For example, the coating solution may be prepared by dissolving an aluminum phosphate-based compound, or precursor compounds each containing aluminum and phosphoric acid, such as aluminum nitrate ($Al(NO_3)_3 \cdot 9H_2O$)) and ammonium phosphate (($NH_4)_2HPO_4$), into distilled water.

(2) Next, a support on which the metal catalyst particles are supported is introduced into the coating solution so as to be coated with the coating solution, followed by drying.

The catalytically active metal or metal-containing alloy supported on the support may be prepared by a method currently used in the art, for example, a precipitation method or a colloid method. There is no particular limitation in the method. For example, a catalytically active metal precursor or a metal-containing precursor compound is added to and allowed to react with a support dispersion obtained by dispersing a support into a solvent, optionally with a reducing agent and a pH modifier, and then the resultant powder is dried.

When the catalyst particle-supported support is added to the coating solution (dispersion or solution), the metal catalyst particles and the anti-coarsening compound are used suitably in a molar ratio of 1~5:1, preferably of 2~3:1. If the molar ratio is less than 1:1, the metal catalyst particles are distributed in an excessively low amount, thereby providing low catalytic activity. In other words, when the concentration of the anti-coarsening compound is too high, the compound may be present even on the surface of the metal catalyst particles, besides the specific sites suitable for inhibiting the particles from coarsening to the optimum degree, i.e., interstitial spaces among the metal catalyst particles and/or contact sites between the support and the metal catalyst particles. Therefore, in this case, presence of the anti-coarsening compound on the surface of the metal catalyst particles causes the problems as described above and consequently leads to the degradation of the quality of a fuel cell, such problems including an increase in electric resistance among catalyst particles, degradation of the proton conductivity to the surface of the metal catalyst particles, and a decrease in reactive surface area of the catalyst. If the molar ratio is greater than 5:1, the metal catalyst particles are present in an excessively large amount when compared to the anti-coarsening compound. Thus, it is not possible to obtain the anti-coarsening effect sufficiently.

The coating step may be performed by using a conventional method generally known to those skilled in the art. Additionally, there is no particular limitation in the drying method. However, it is preferred that the coated catalyst particles are dried at a temperature of 90° C. or lower for several hours to allow distilled water used in the coating solution to evaporate completely.

(3) After the anti-coarsening compound is dispersed on the surface of the catalytically active metal or metal-containing alloy particles supported on the support or interstitial volumes among the particles to a desired thickness, the electrode catalyst is heat treated to complete the structurally stable electrode catalyst according to the present invention.

Such heat treatment further stabilizes the structure of the anti-coarsening compound in the electrode catalyst and the binding between the support and the anti-coarsening compound. Additionally, such heat treatment also serves to completely remove a trace amount of impurities that may inhibit electrochemical reactions under the drive conditions of the electrode catalyst. Herein, the heat treatment step may be performed at any temperature with no particular limitation, as long as the temperature is lower than the temperature where the metal catalyst particles formed of the catalytically active metal or metal-containing alloy start coarsening. For example, the heat treatment step may be performed at a temperature ranging from 110° C. to 300° C. for 2~4 hours.

The method for preparing the electrode catalyst according to the present invention includes the use of an aqueous coating solution and comprises a simple process requiring a relatively short time of heat treatment, so that the method can be applied to an existing process with ease and can be performed at a reduced cost.

According to another aspect of the present invention, there is provided an electrode for fuel cells, which comprises the electrode catalyst obtained as described.

The electrode for fuel cells comprises a gas diffusion layer and a catalyst layer. It may comprise a catalyst layer alone. Otherwise, it may have a catalyst layer integrally formed on a gas diffusion layer.

The electrode for fuel cells according to the present invention can be manufactured by a conventional method known to one skilled in the art. In one embodiment of the method, the electrode catalyst is mixed with catalyst ink that contains a highly proton conductive polymer material and a mixed solvent enhancing dispersion of the catalyst to provide slurry. Then, the slurry is applied on carbon paper by a printing, spraying, rolling or a brushing process, and then dried.

According to still another aspect of the present invention, there is provided a membrane electrode assembly (MEA) for fuel cells, which comprises: (a) a first electrode having a first catalyst layer; (b) a second electrode having a second catalyst layer; and (c) an electrolyte membrane interposed between the first electrode and the second electrode, wherein either or both of the first catalyst layer and the second catalyst layer comprise the electrode catalyst according to the present invention.

One of the first and the second electrodes is a cathode and the other is an anode.

The membrane electrode assembly refers to an assembly of an electrode for carrying out an electrochemical catalytic reaction between fuel and air with a polymer membrane for carrying out proton transfer. The membrane electrode assembly is a monolithic unit having a catalyst electrode adhered to an electrolyte membrane.

In the membrane electrode assembly, each of the catalyst layers of the anode and cathode is in contact with the electrolyte membrane. The MEA can be manufactured by a conventional method known to one skilled in the art. For example, the electrolyte membrane is disposed between the anode and cathode to form an assembly. Next, the assembly is inserted into the gap between two hot plates operated in a hydraulic manner while maintaining a temperature of about 140° C., and then pressurized to perform hot pressing.

There is no particular limitation in the electrolyte membrane, as long as it is a material having proton conductivity, mechanical strength sufficient to permit film formation and high electrochemical stability. The electrolyte membrane includes, but not exclusively, tetrafluoroethylene-co-fluorovinyl ether, wherein the fluorovinyl ether moiety serves to transfer protons.

According to yet another aspect of the present invention, there is provided a fuel cell comprising the above membrane electrode assembly.

All materials forming the fuel cell, other than the electrode catalyst according to the present invention, are those currently used in a conventional fuel cell. Particularly, all materials used in a proton exchange membrane fuel cell, are preferred.

Also, there is no particular limitation in the method for manufacturing the fuel cell. The fuel cell may be manufactured by using the above membrane electrode assembly, which comprises a cathode, an anode and a membrane electrode assembly comprising an electrolyte coated with an active layer containing the electrode catalyst, and a bipolar plate in a conventional manner known to one skilled in the art.

Preferably, the fuel cell is a proton exchange membrane fuel cell (PEMFC) that adopts reduction of oxygen and oxidation of hydrogen, but is not limited thereto.

Further, the present invention provides a method for preventing metal catalyst particles supported on a support and formed of a catalytically active metal or metal-containing alloy from coarsening, the method comprising: dispersing an anti-coarsening compound having a coarsening temperature higher than that of the metal catalyst, in at least one region selected from the group consisting of interstitial spaces among the metal catalyst particles and contact sites between the support and the metal catalyst particles.

In fact, it can be seen from the following experimental examples that catalytically active metal or metal-containing alloy particles can be prevented from coarsening even under an increased temperature.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention. It is to be understood that the following examples are illustrative only, and the scope of the present invention is not limited thereto.

EXAMPLES 1 AND 2

Example 1

1-1. Preparation of Platinum-Supported Carbon Catalyst Coated with Aluminum Phosphate-Based Compound Ammonium phosphate was added to a predetermined amount of distilled water and the mixture was agitated sufficiently to dissolve the ammonium phosphate therein. Next, aluminum nitrate was added thereto and the mixture was agitated sufficiently. At this time, ammonium phosphate and aluminum nitrate were used in a weight ratio of 0.38:1. As the reaction progressed, a white-colored coating solution was obtained while an aluminum phosphate-based compound was formed. To the coating solution, platinum-supported carbon containing platinum particles having an average particle size of about 2.6 nm was added. At this time, platinum and an aluminum phosphate-based compound were used in a molar ratio of 3:1. The resultant coated platinum-supported carbon was completely dried in an oven at a temperature of 90° C. or less, and then heat treated at 200° C. for 2 hours to cause the aluminum phosphate-based compound to be coated on the surface of the platinum-supported carbon.

1-2. Manufacture of Electrode

The platinum-supported carbon coated with the aluminum phosphate-based compound according to Example 1-1 was mixed with Nafion ink having high proton conductivity, and the mixture was applied onto a carbon electrode to provide an oxygen electrode. Additionally, a catalyst (Hispec 9100) commercially available from Johnson-Matthey Co. was used in the same manner as described above to provide a fuel electrode. Herein, platinum was supported in an amount of 0.25 mgPt/cm$^2$ and 0.5 mgPt/cm$^2$, respectively, in the oxygen electrode and the fuel electrode.

1-3. Manufacture of Membrane Electrode Assembly (MEA)

Figure 1:
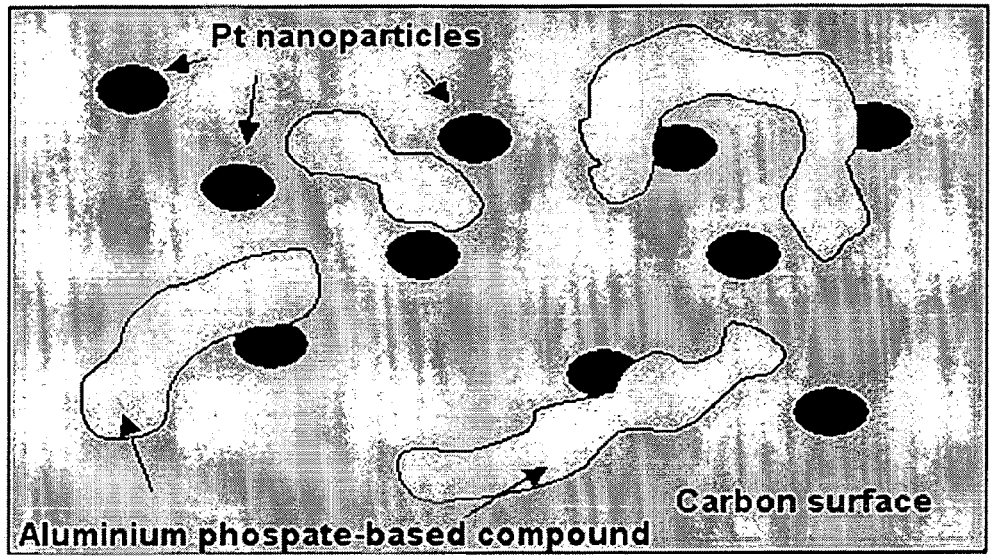
FIG. 1 is a schematic view showing the condition of the surface of an electrode catalyst according to the present invention.
Figure 2:
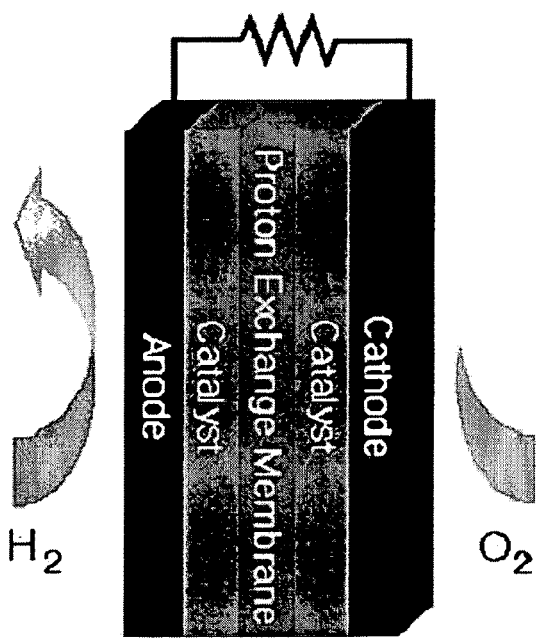
FIG. 2 is a schematic view showing a proton exchange membrane fuel cell.

A Nafion electrolyte membrane was bonded thermally and mechanically between both electrodes obtained according to Example 1-2 to provide a membrane electrode assembly, which, in turn, was used to manufacture a proton exchange membrane fuel cell (see FIG. 2).

Example 2

An electrode catalyst, a membrane electrode assembly and a proton exchange membrane fuel cell were manufactured in the same manner as described in Example 1, except that the heat treatment was performed at a temperature of 300° C. instead of 200° C.

Comparative Example 1

A membrane electrode assembly and a fuel cell comprising the same were manufactured in the same manner as described in Example 1, except that a platinum-supported carbon catalyst that was not coated with an aluminum phosphate-based compound was used.

Experimental Example 1

X-Ray Diffraction Analysis for Electrode Catalyst

Analysis for the electrode catalyst according to the present invention was performed as follows.

The platinum-supported carbon catalysts coated with an aluminum phosphate-based compound were used as samples, and non-coated platinum-supported carbon was used as a control.

Figure 3:
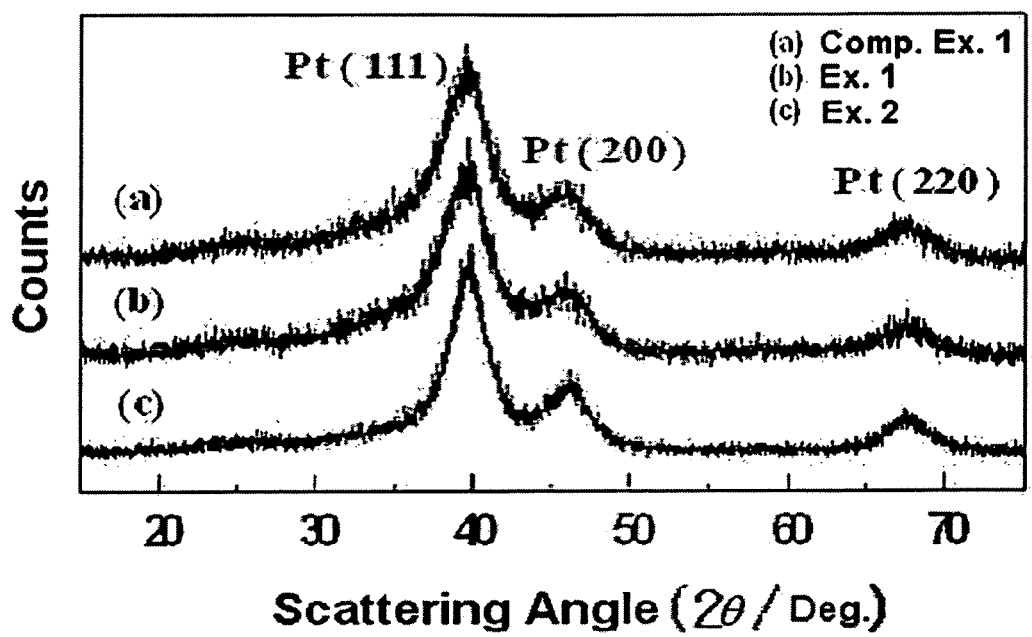
FIG. 3 is a graph showing the results of X-ray diffraction analysis of the platinum-supported carbon catalysts coated with an aluminum phosphate-based compound according to Examples 1 and 2, and of the non-coated platinum-supported carbon catalyst according to Comparative Example 1.

FIG. 3 shows the results of the X-ray diffraction analysis for the crystal structure of platinum supported on a support, wherein the width of the Pt(111) peak relates to the size of platinum particles, and platinum particle size decreases as the peak width increases. In the case of the electrode catalyst heat treated at 200° C. according to Example 1, it can be seen that growth of platinum particles, i.e. coarsening of platinum particles is inhibited by the coating effect of the metal phosphate compound used as an anti-coarsening compound. Additionally, in the case of the electrode catalyst heat treated at 300° C. according to Example 2 shows a slightly decreased peak width. This indicates that partial coarsening of platinum particles occurs (see FIG. 3).

Experimental Example 2

Evaluation for Coarsening Tendency of Electrode Catalyst

The following test was performed to evaluate the coarsening tendency of the electrode catalyst according to the present invention.

The platinum-supported carbon catalyst coated with an aluminum phosphate-based compound according to Example 1 was used as a sample, and the non-coated platinum-supported carbon catalyst according to Comparative Example 1 was used as a control. The platinum nanoparticles present in each electrode catalyst were measured for variations in size while varying the temperature from room temperature to 300° C. The results are shown in the following Table 1.

After the test, the non-coated conventional electrode catalyst according to Comparative Example 1 shows an increase in size of the platinum nanoparticles to about 4.8 nm at a temperature of 300° C. This indicates that coarsening of platinum nanoparticles occurs due to the increased temperature. On the contrary, the electrode catalyst coated with an aluminum phosphate-based compound according to Example 1 shows little coarsening of platinum particles even under high temperature, and is prevented from coarsening (see Table 1).

TABLE 1

| Temperature (° C.) | Size of Pt nanoparticles in electrode catalyst (particle diameter; nm) | |
|---|---|---|
| | Comp. Ex. 1 | Ex. 1 |
| Room temperature | 2.62 nm | 2.62 nm |
| 200° C. | 3.50 nm | 2.70 nm |
| 300° C. | 4.80 nm | 3.22 nm |

Experimental Example 3

Evaluation for Quality of Fuel Cell

The following test was performed to evaluate the quality of a unit cell using the electrode catalyst according to the present invention.

Figure 4:
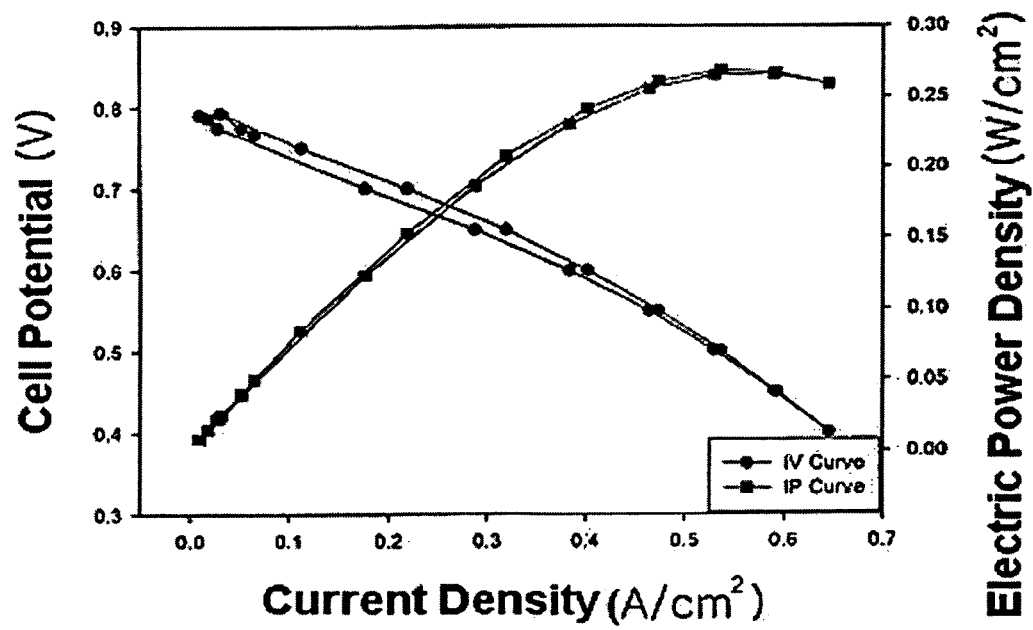
FIG. 4 is a graph showing the quality of a fuel cell using the platinum-supported carbon catalyst coated with an aluminum phosphate-based compound according to Example 1.

To both electrodes of the unit cell obtained from Example 1, air and hydrogen were supplied. Then, current density and electric power density were measured while varying the voltage applied between both terminals of the unit cell. The results are shown in FIG. 4.

After the test, the electrode catalyst according to Example 1 shows a current density of 0.27 A/cm$^2$ and an electric power density of 0.17 W/cm$^2$ at 0.65V. It can be seen from these results that the electrode catalyst according to the present invention has quality equivalent to the quality of a membrane electrode assembly for a general polymer electrolyte fuel cell, when the amount of platinum supported on the oxygen electrode of 0.25 mgPt/cm$^2$ is taken into consideration (see FIG. 4).

INDUSTRIAL APPLICABILITY

As can be seen from the foregoing, according to the present invention, a compound capable of preventing a catalytic substance for an electrode from coarsening is coated onto and/or dispersed in such sites that coarsening of the catalytic substance can be inhibited to the highest degree, thereby improving the structural stability of the catalytic substance. Therefore, it is possible to provide a fuel cell having excellent lifespan characteristics while not causing any degradation of electrochemical quality.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrode catalyst comprising:
   (a) a support;
   (b) metal catalyst particles coated on the support and formed of a catalytically active metal or metal-containing alloy, the metal catalyst particles directly contacting the support; and
   (c) an anti-coarsening compound, which is dispersed in at least one region selected from the group consisting of interstitial spaces among the metal catalyst particles and regions around which the metal catalyst particles contact with the support, and has a coarsening temperature higher than that of the metal catalyst particles,
   wherein the anti-coarsening compound is an aluminum phosphate-based compound,
   wherein a molar ratio of the metal catalyst particles and the anti-coarsening compound is 1:1 to 5:1, and
   wherein the anti-coarsening compound is not present on the surface of the metal catalyst particles.

2. The electrode catalyst according to claim 1, wherein the coarsening temperature is a temperature at which crystal particles start to grow.

3. The electrode catalyst according to claim 1, wherein metal catalyst particles (b) have a coarsening temperature of 300° C. or lower, and anti-coarsening compound (c) has a coarsening temperature of 300° C. or higher.

4. The electrode catalyst according to claim 1, wherein the catalytically active metal or metal-containing alloy particle is at least one selected from the group consisting of platinum (Pt), ruthenium (Ru), rhodium (Rh), palladium (Pd), gold (Au), silver (Ag), iridium (Ir) and osmium (Os).

5. The electrode catalyst according to claim 1, wherein the catalytically active metal or metal-containing alloy particles have a size (particle diameter) of 1~10 nm.

6. The electrode catalyst according to claim 1, wherein anti-coarsening compound (c) has a higher affinity to support (a) when compared with its affinity to catalytically active metal or metal-containing alloy (b).

7. The electrode catalyst according to claim 1, wherein the anti-coarsening compound is coated or dispersed to a thickness of 1-5 nm.

8. The electrode catalyst according to claim 1, wherein the support is selected from the group consisting of porous carbon, conductive polymers and metal oxides.

9. A membrane electrode assembly comprising:
   (i) a first electrode having a first catalyst layer;
   (ii) a second electrode having a second catalyst layer; and
   (iii) an electrolyte membrane interposed between the first electrode and the second electrode,
   wherein either or both of the first catalyst layer and the second catalyst layer include the electrode catalyst as defined in claim 1.

10. The membrane electrode assembly (MEA) according to claim 9, wherein metal catalyst particles (b) have a coarsening temperature of 300° C. or lower, and anti-coarsening compound (c) has a coarsening temperature of 300° C. or higher.

11. The membrane electrode assembly (MEA) according to claim 9, wherein anti-coarsening compound (c) has a higher affinity to support (a) when compared with its affinity to catalytically active metal or metal-containing alloy (b).

12. A fuel cell comprising the membrane electrode assembly (MEA) as defined in claim 9.

13. The fuel cell according to claim 12, which is a proton exchange membrane fuel cell (PEMFC).

* * * * *